July 3, 1962

G. A. WELCH III 3,042,185

MULTI-CHANNEL DOCUMENT CONVEYOR

Filed June 8, 1959

INVENTOR
GARRETT A. WELCH III
BY
ATTORNEY

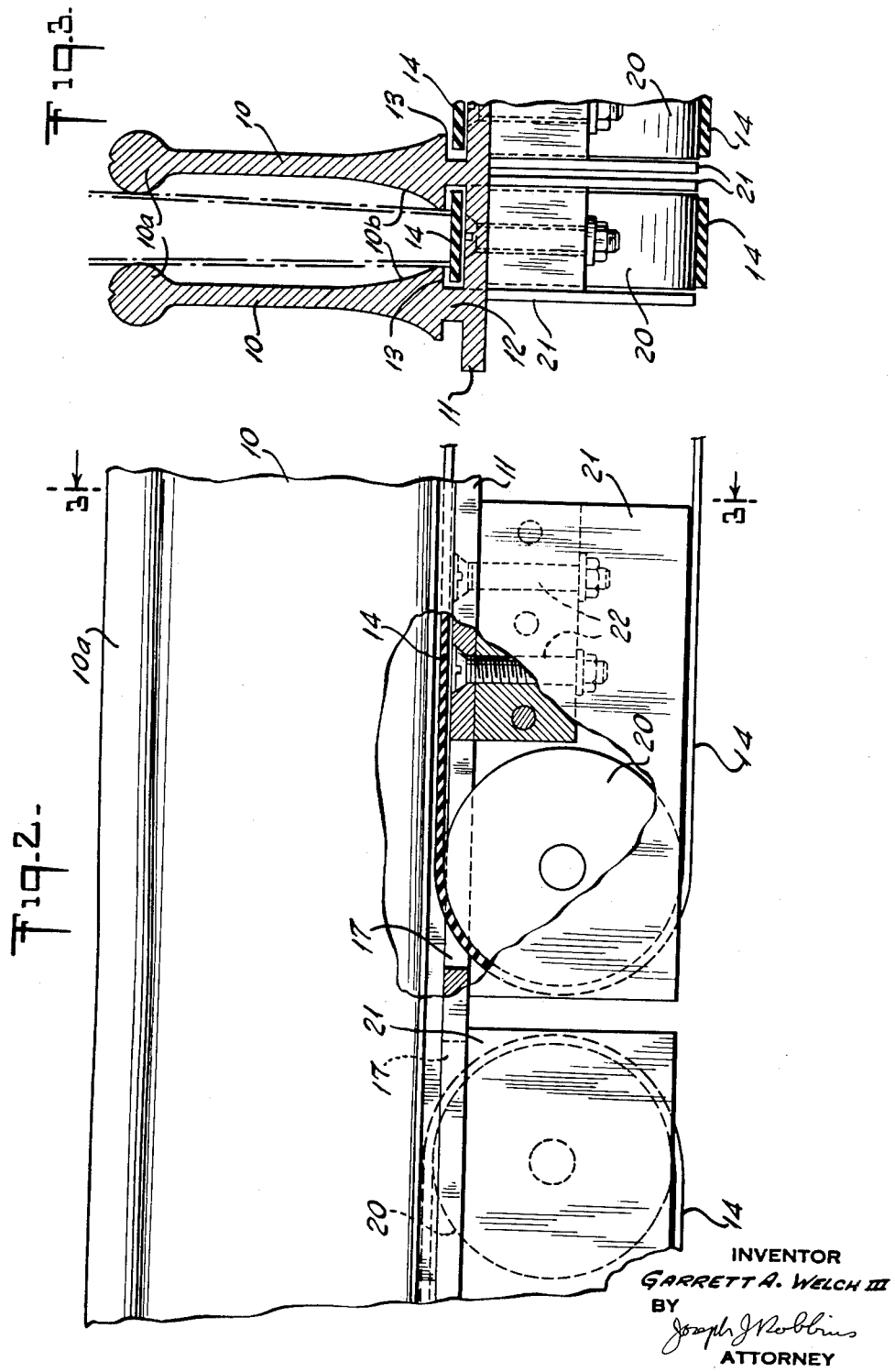

United States Patent Office 3,042,185
Patented July 3, 1962

3,042,185
MULTI-CHANNEL DOCUMENT CONVEYOR
Garrett A. Welch III, Roslyn, N.Y., assignor, by mesne assignments, to International Postal Supply Corporation, a corporation of Massachusetts
Filed June 8, 1959, Ser. No. 818,653
5 Claims. (Cl. 198—160)

This invention relates to channeled conveyors and particularly to conveyors in which documents such as record slips or letters or the like are fed in channeled courses by bottom edge engagement with conveyor belting.

Heretofore, the channels of the conveyors have been built up at the place of installation by assembling individual channel side pieces to individual channel base pieces. With ordinary manufacturing tolerance, slight variations occur at random in the various individual pieces, the effect of these variations being cumulative when a multiplicity of the individual pieces are assembled to one another. Hence, not only is considerable labor, with attendant expense, involved in assembling the individual side walls and bases into channel structures at the place of the installation, but additional labor and expense are incurred in bending and shaping the channel walls into parallelism, in alining successive lengths of the side walls and bases so that there will be no protruding junctures to catch and tear documents, and in making other adjustments and corrections required to produce a working relationship of the assembled pieces.

The present invention avoids the above difficulties by provision of a rigid one-piece channel unit having integral channel walls and base formed preferably by extrusion from suitable material such as aluminum and ready for installation as complete channel structures. These one-piece channel units can be extruded in various chosen lengths and in widths of one, two, three or more channels. Each one-piece channel unit has the rigidity and stability of a beam structure and is formed to close and uniform dimensions by the extrusion process. Owing to the uniformity and stability of dimension and shape with which the channel units can be extruded, similar channel units are easily interchangeable and successive channel units can be alined end-to-end without edges at the junctures protruding into the channel spaces to catch and tear documents or otherwise interfere with the smooth flow of the documents from one unit to the next. The rigidity of the one-piece channel unit makes it possible to use the base of the unit as a direct and sole support from which the belt pulleys and their housings may be fixedly hung. A conveyor comprised of the one-piece channel units can be installed and dismantled with a minimum of labor and expense and units can be removed or added without difficulty.

According to the invention, the one-piece channel unit will be formed with belt edge-receiving recesses or gutters at the junctions of the channel side walls with the base for the purpose of containment of the belt edges to shield them from the documents. By containment of the edges of the conveyor belt overlying the channel base and feeding the documents in the channel, the documents will be prevented from lodging and wedging between the belt edges and the interior surfaces of the channel. The lower portions of the channel side walls will be formed with a downward and inward slope into the channel space to bias the documents at their lower ends away from the side portions of the belt, thus helping to prevent the documents from entering between the channel walls and the belt edges. The channel side walls will be shaped further to minimize frictional engagement with the documents traveling in the channel.

Other objects and advantages of the invention will be brought out in the detailed description and in the claims and will appear from the drawings in which:

FIG. 2 is is a partly sectioned side view of a one-piece channel unit and associated belts and pulleys; and FIG. 3 is a fragmentary section on line 3—3 of FIG. 2.

Figure 1:
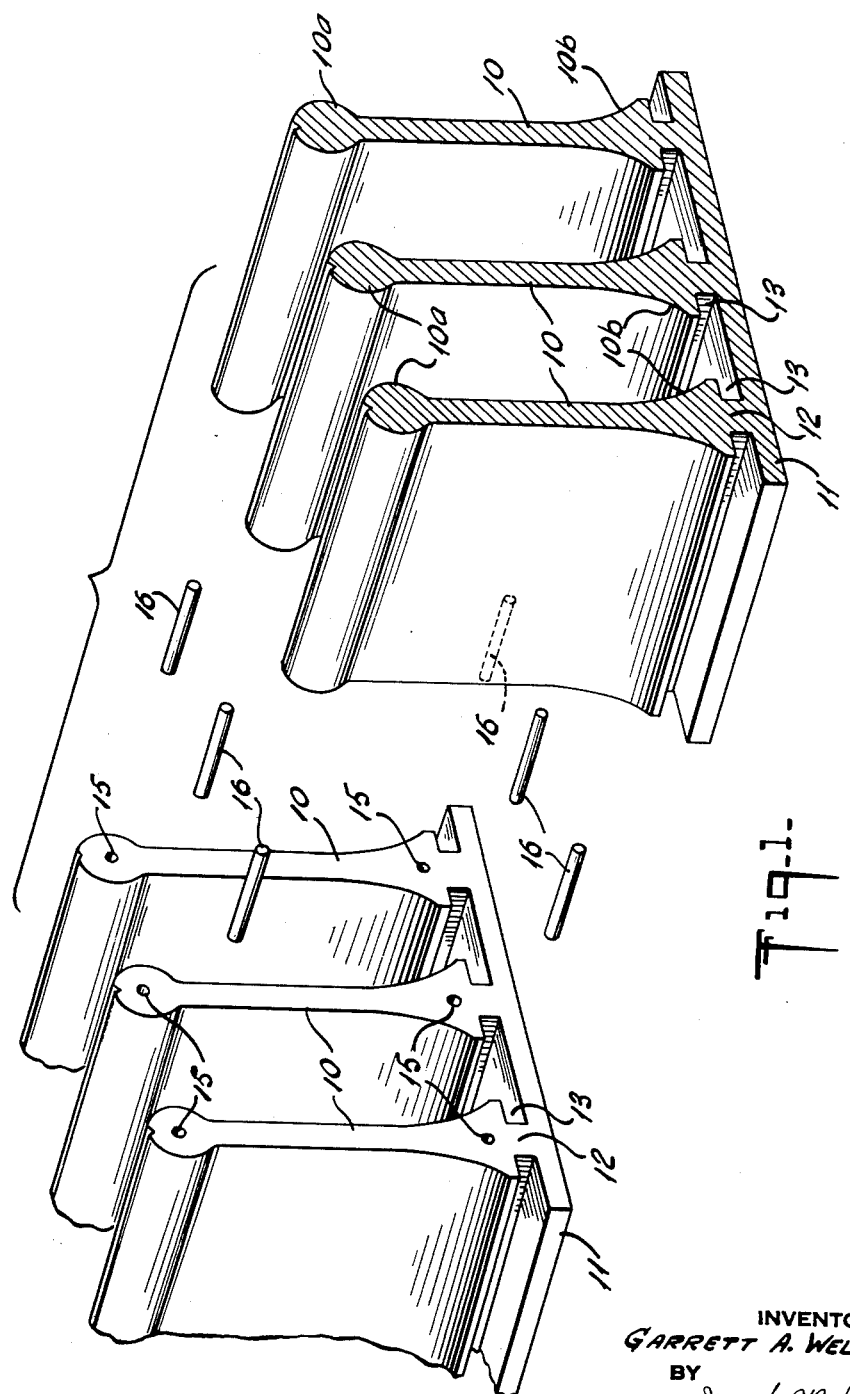
FIG. 1 is a perspective view of adjacent end portions of two of the one-piece channel units ready for end-to-end alinement.

The invention is exemplified by one-piece channel units of dual channel width, as best seen in FIG. 1. Two parallel channels are defined by three parallel vertically disposed channel side walls 10 integrally formed with a common base 11 providing a bottom wall for each channel. Each side wall 10 has an enlarged rounded top portion 10a and a symmetrically diverging triangular lower portion 10b, so that as a document travels in a channel it will have sliding contact, at most, only with the inmost edges of the top and bottom portions of a channel side wall. In further explanation, the rounded top portion or bead 10a projects laterally into a channel space at either side of the wall and into the channel spaces at opposite sides of the wall if it is a divider between two such spaces. The effect is that the channel wall proper, or in the main, is recessed below the top bead 10a for the length of the wall. In practice, the document resting on edge on the belt 14 at the bottom of a channel usually has a somewhat slanted disposition and is in virtual line contact with the top projection 10a which keeps the document away from the recessed length of the wall portion below the top projection, although the document occasionally also has line contact with the inwardly projecting longitudinal edge of the bottom triangular rib 10b. Thus frictional retardation of the documents will be a minimum. Also, the reduced frictional drag so reduces the generation of static as to virtually eliminate tendency of the documents to adhere to the channel sides because of electrostatic attraction. Still further, the reduced contact between the documents and the channel side wall prevents the documents from getting smudged or dirty in their travel along the channel. The triangular lower portions 10b are joined integrally with the base 11 by narrow ribs 12, leaving shoulders of the triangular portions in overhanging spaced relation to the belt-underlying surface of the base 11. Recesses or gutters 13 are thus formed between the base and the lower ends of the channel side walls to receive and guard the side portions of a conveyor belt 14 traveling at the bottom of the channel (see FIGS. 2 and 3). The containment of the belt edges by the gutters 13 prevents documents in a channel from lodging or wedging between the belt edges and the inside surfaces of the channel. The slope of the lower triangular portions 10b of the channel side walls downward and inward into the channel space biases the documents in a channel away from the side portions of the belt at the bottom of the channel, thereby helping to prevent the documents from slipping into the gutters 13 to be caught by the belt edges.

The one-piece channel units are extruded with high accuracy and stability of dimension and form, so that units of similar channel width, height and cross-section can be brought together in end-to-end abutment and alinement without leaving edges at the junctures protruding into channel spaces to catch and tear documents or otherwise hinder their smooth flow along the channels from one channel unit to the next. The butt ends of the channel units are machine squared and provided with accurately located holes 15. Lateral stability of alined channel units relative to each other is obtained by insertion of split pins 16 into the holes 15 as the units are brought together into end-to-end alinement. The channel extrusions, of aluminum, have been produced according to the invention in widths up to five channels. They can be produced in units of lengths up to approximately 60 feet with a very high degree of dimensional accuracy and uniformity, but for facility in handling and installation, a section 8 feet in length has been adopted as standard. Each such channel section is a rigid, stiff, inseparable homogeneous metal unit characterized by an elongated web formed integrally with parallel flanges lengthwise of the web and in solid metallic continuity with the web, the web portion between parallel channel-defining flanges serving as a bed or base over which a belt 14 is run to convey documents between the flanges.

As seen in FIG. 2, the conveyor belts 14 pass freely through openings 17 in the channel base 11 into engagement with pulleys 20 which intrude into these openings. The pulleys are journaled in housings 21 fixed dependently to the bottom of base 11 of the channel unit by shoulder screws 22. The belts or belt in each channel may be run in any desired direction. Two belts along longitudinally spaced lengths of the same channel may be run in relatively opposite directions so that documents may be brought from opposite ends of the channel toward a common location or may be fed from the common location toward opposite ends of the channel.

While the invention has been disclosed in connection with a specific embodiment, it is understood that changes can be made in the form and details of the disclosed embodiment without departing from the spirit of the invention. It is intended therefore to be limited only as indicated by the scope of the following claims.

What is claimed is:

1. In a conveyor for feeding channeled documents by bottom edge engagement with conveyor belting an elongated one-piece rigid metallic conveyor channel extrusion length formed with a plurality of solid parallel channel sides walls and with a common plate-like base spanning the lower ends of the plurality of channel side walls and providing a belt-underlying surface at the channel bottom between the side walls, and a rib at the lower end of each wall constituting an integral confluent bridge between the wall and the base, the rib being narrower than the lower end of the wall and laterally overhung at each side by said lower end to provide belt edge-guarding recesses at opposite sides of the rib.

2. In a conveyor for feeding upright-disposed documents along parallel channels by bottom edge engagement with conveyor belts, an elongated one-piece rigid metal, multi-channel extrusion length formed with three or more parallel channel side walls to define two or more channels and with a common plate-like base spanning the lower ends of the channel side walls and providing a plurality of respective belt-underlying surfaces at the bottoms of the plurality of channels, and a rib at the lower end of each wall constituting an integral confluent bridge between the wall and the base, the rib being narrower than the lower end of the wall and symmetrically laterally overhung thereby, whereby belt edge-guard recesses are provided at opposite sides of the rib.

3. A channeled conveyor for documents in upright disposition, including a rigid multi-channel side wall-and-base unit of one solid single piece of metal and comprising an elongated horizontal base, at least three lengthwise extending parallel upright flanges spanned by said base and constituting channel side walls defining at least two parallel channels for guiding documents in upright disposition, conveyor belts traveling over the base at the channel bottoms for feeding the documents along the channels by bottom edge engagement with the documents, and an upright rib between the lower end of each wall and the base and in integral metal confluence with the wall and the base, the lower end of each wall being formed with lateral shoulders respectively to opposite sides of the adjoining rib and spaced by the height of the rib above belt-underlying base surfaces at the bottoms of the channels flanking the wall, whereby belt edge-guarding recesses are provided at opposite sides of each rib and open respectively into the channels flanking the wall joined by the rib to the base.

4. In a conveyor for feeding documents in upright disposition along at least two parallel channels by bottom edge engagement with conveyor belts running at the bottoms of these channels, a channel unit including an upright wall capable of serving as a dividing side wall between a pair of flanking channel spaces, a base integral with the upright wall, a rib constituting an integral confluent bridge between the wall and the base, the wall being formed at its lower end with belt edge-guarding gutters at opposite sides of said rib, the gutters at the opposite sides of said rib opening respectively into the channel spaces flanking the wall, one of said gutters to guard an edge of a belt running in one of the flanking channel spaces and the other of said gutters to guard an edge of the belt running in the other of the flanking channel spaces.

5. In a multi-channel document conveyor wherein upright-disposed documents are fed along parallel channels by bottom edge engagement with conveyor belts, an elongated multi-channel unit comprising at least three upright parallel channel side walls defining at least two channels and further comprising a base spanning the lower ends of the side walls to provide belt-underlying surfaces at the bottoms of the channels, the dividing side wall between a pair of the channels being formed with an upper solid bead edge of enlarged cross-section intruding laterally into the channel spaces flanking the dividing wall, the intrusive sides of said upper edge being rounded to provide for substantial line engagement with documents traveling along either side of the dividing wall, whereby frictional drag of the dividing wall on the documents is reduced.

References Cited in the file of this patent

UNITED STATES PATENTS

| 860,923 | Lawrence | July 23, 1907 |
| 1,919,175 | Smith | July 18, 1933 |
| 1,992,349 | Beardsley et al. | Feb. 26, 1935 |

UNITED STATES PATENT OFFICE
CERTIFICATE OF CORRECTION

Patent No. 3,042,185                                        July 3, 1962

Garrett A. Welch III

It is hereby certified that error appears in the above numbered patent requiring correction and that the said Letters Patent should read as corrected below.

Column 3, line 39, after "belting" insert a comma; lines 40 and 41, for "extrustion" read -- extrusion --.

Signed and sealed this 20th day of November 1962.

(SEAL)
Attest:

ERNEST W. SWIDER                                           DAVID L. LADD
Attesting Officer                                            Commissioner of Patents